United States Patent [19]
Trillich

[11] 3,738,492
[45] June 12, 1973

[54] OIL-WATER SEPARATOR
[75] Inventor: Charles H. Trillich, Morris Plains, N.J.
[73] Assignee: Brunswick Corporation, Skokie, Ill.
[22] Filed: Mar. 17, 1972
[21] Appl. No.: 235,625

[52] U.S. Cl. ............... 210/196, 210/301, 210/307, 210/336, 210/DIG. 5
[51] Int. Cl. .......................................... B01d 23/10
[58] Field of Search .................... 210/301, 307, 23, 210/335, DIG. 5, 336, 339, 196

[56] References Cited
UNITED STATES PATENTS
3,469,702  9/1969  Perren ........................... 210/301 X
3,312,350  4/1967  Kasten ............................... 210/307
3,016,345  1/1962  Price ............................... 210/23 X Primary Examiner—Frank A. Spear, Jr.
Attorney—Donald S. Olexa, Sheldon L. Epstein, John G. Heimovics and William G. Lawler, Jr.

[57] ABSTRACT

A system for separating a mixture of two liquids having different specific gravities (e.g., an oil-water emulsion) is disclosed. The illustrated embodiment comprises a plurality of vertically arranged separating tanks, the lower chambers containing coalescing filters made of oleophillic materials. Emulsion flows from inside to outside these filters and oil coalesces on the outside or downstream side of the filters where bubbles can form to float to the surface. Taps are provided outside the filters to remove coalesced oil. Means for recirculating free oil to improve separation are also taught.

8 Claims, 4 Drawing Figures

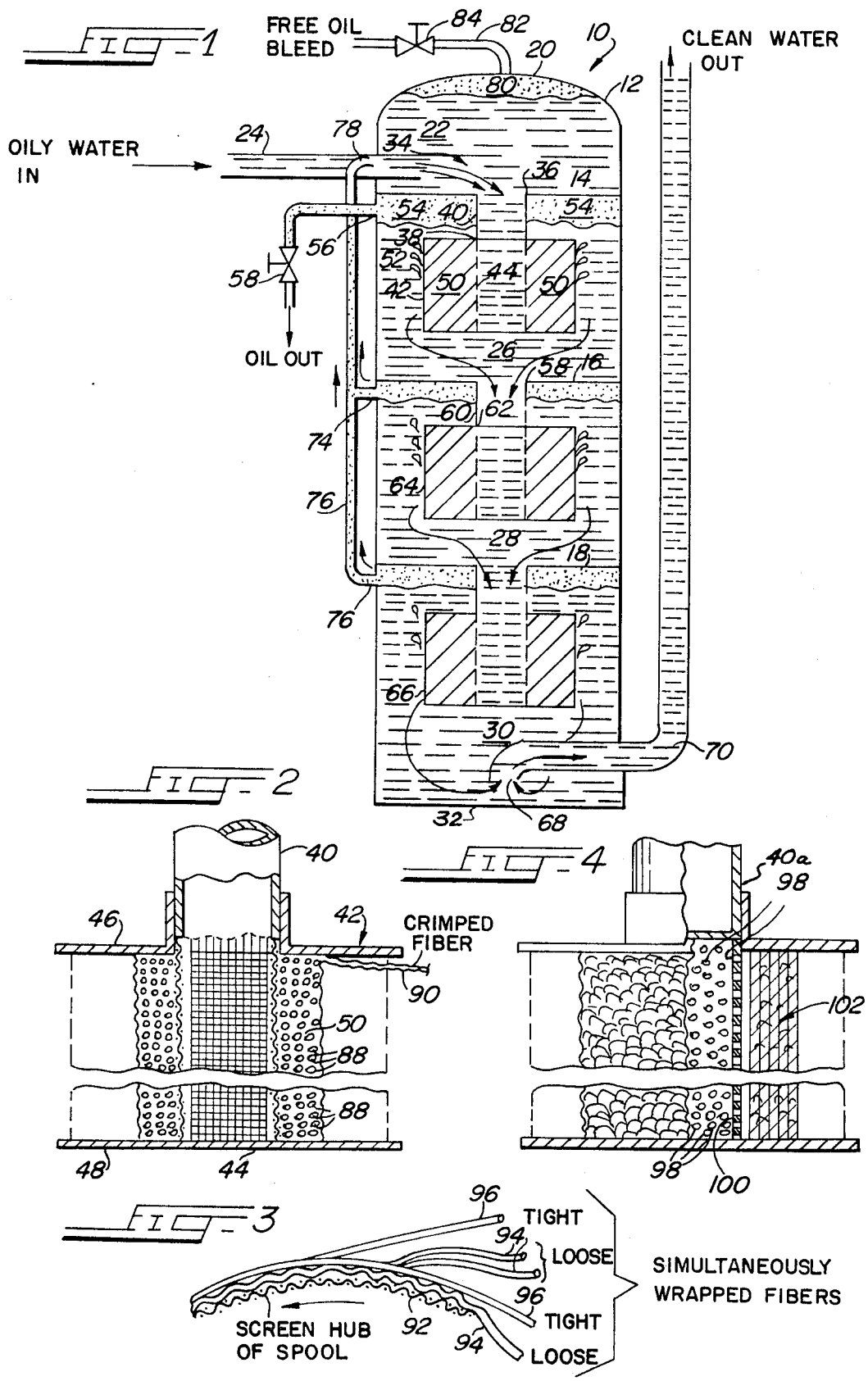

OIL-WATER SEPARATOR

BACKGROUND OF INVENTION

1. Field of Invention

This invention is a system for separating a mixture of two liquids having different specific gravities (U.S. Class 210–301) and more particularly is a separator particularly adapted for breaking up oil-water emulsions.

2. Description of the Prior Art

A major environmental problem is the handling of mixtures of immiscible liquids which may be undesirable byproducts of a production process, the results from accidental spills or the like. The most common mixtures which present pollution problems are oil-water liquids — especially emulsions. Emulsions are particularly troublesome because only a few percent of the volume of the material constitutes an ecological hazard; yet, unless the oil and the emulsifiers are removed, the great bulk constituting only water cannot be drained. Examples of industries where the problem is already serious are shipping, when bilge and ballast tanks are flushed with sea water and in the machine tool industry when rancid cutting oils must be dumped. Again in both these cases, the contaminating constituent constitutes only a small percent of the volume of the mixture and — if it could be separated from the water — could be disposed of without imperiling the environment.

A number of oil-water separating techniques have been used with varying degrees of success in attempts to remove oil below its solubility level in water — generally about 40 parts per million. The most successful systems comprise a combination of coalescing filters and separating chambers such as those taught by the following U.S. Pat. Nos. listed in their approximate order of importance:

| | | |
|---|---|---|
| 3,032,403 | Kohl | 1 May 62 |
| 3,503,514 | Lawson | 31 Mar 70 |
| 3,055,505 | Lawson | 25 Sep 62 |
| 2,651,414 | Lawson | 8 Sep 53 |
| 2,432,317 | Lawson & Young | 9 Dec 47 |
| 3,405,838 | Lawson & Young | 13 Aug 46 |
| 3,468,421 | Hazel & Bakker | 23 Sep 69 |
| 3,407,937 | Bakker & Hazel | 29 Oct 68 |

As evidenced in the two papers by R. N. Hazlett of the Naval Research Laboratory in *I & EC Fundamentals* (Vol. 8 No. 4, Nov., 1969) entitled:

"Fiberous Bed Coalescence of Water — Steps in the Coalescence Process" (pp. 625–32), "Fiberous Bed Coalescence of Water — Role of a Sulfonate Surfactant in The Coalescence Process" (pp. 633–640) the process of liquid-liquid separation via coalescence is not well understood despite concentrated research by the military and others on methods of removal of water from jet fuel and other petroleum products. Therefore, in this largely empirical art, it is not unexpected to discover that small changes in components and their relationship to the total system cause unpredictedly large improvements in separator performance.

Each of the separators described in the patents cited above comprise two essential components; namely, a number of separation chambers (or zones) and coalescence filters for the separation chambers. The function of the coalescence filter is to provide a site where the small bubbles of emulsified oil can collect and merge into a substantially large bubble which becomes buoyant in water. The separation chamber provides the environment for these larger bubbles to float upward in water to a point where they can coalesce into even larger bodies of oil.

The most commercially successful separators are of the types shown in the patents to Lawson, Young, Hazel and Bakker. A prominent characteristic of these separators is their use of horizontally aligned separating chambers. The purpose of this arrangement appears to be to permit high rates of water to flow in a direction normal to the buoyant force of the oil — thus permitting the oil to reach the surface with fast water currents. A second system — which has not been seen commercially is taught in Kohl's patent. Aside from its agitator, its principal characteristic is the use of vertically aligned separation chambers which provide a convenient geometry for continuously agitating the mixture through its mixing and separating process. Both systems, however, adopt the common practice of using filters which apparently are oleophobic and cause coalescence on the upstream side of the filter. This is where pressures and turbulence are the highest.

Experiments with the separator of this invention show, however, that separation is substantially improved if coalescence takes place under near-quiescent conditions on the downstream side of oleophilic filters located at the entrances of their respective separation chambers. The slower flow rate at the downstream side of the filter permits larger bubbles to coalesce than in the conventional configuration and the chamber now resembles a settling tank which permits more efficient separation.

These features and advantages, as well as others, contributing to the object of improved separation of mixed liquids such as oil-water emulsions are more fully explained below in the description of a preferred embodiment in which the drawings comprise:

FIG. 1 is a diagrammatic sectional view of a separator made in accordance with this invention;

FIG. 2 is a greatly enlarged sectional view showing the construction of one of the separator coalescing elements shown in FIG. 1;

FIG. 3 is a diagrammatic view showing a modified construction for wrapping the fibers on the spool shown in FIG. 2; and FIG. 4 is a fragmentary sectional view, similar to FIG. 2, but showing the separator coalescing element wound with sheet material instead of fibers.

DESCRIPTION OF PREFERRED EMBODIMENTS

FIG. 1 shows a system 10 for separating a mixture of two liquids having different specific gravities (i.e., an oil-water emulsion). The system 10 comprising a housing 12 divided into four vertically stacked separating chambers by partitions 14, 15 and 18. The housing 10 has a dome 20 at its upper end and the space between the dome 20 and the partition 14 provides a chamber 22. This chamber 22 will be referred to herein as the highest or upper chamber and it includes an inlet 24 for the introduction of the mixture into the system.

The housing 10 has three lower chambers. These lower chambers include a first chamber 26 between the partitions 14 and 16; a second chamber 28 between the partitions 16 and 18; and a third chamber 30 between the partitions 18 and a bottom 32 of the system 10.

Emulsion designated by the reference character 34 enters the upper chamber 22 through the inlet 24 which extends through the wall of the housing 10 and which preferably extends some distance into the chamber 22 so that the emulsion is discharged at a location spaced from the walls of the chamber.

There is an aperture 36 at the bottom of the upper chamber 22 which in turn is connected to an orifice 38 in the first lower chamber 26 by a conduit 40. The conduit 40 serves as a means for coupling the chambers into a hydraulic series connection so that the emulsion can flow from the aperture 36 to the orifice 38 and then directly into the inlet of separator coalescing filter 42 which is attached to the conduit 40 so that the emulsion must pass through the coalescing filter before traversing the separating chamber.

The coalescing filter is preferably of the type described by Guilford B. Peters in his commonly owned, copending patent application entitled "Coalescing Filter for Oil-Water Separators," Ser. No. 235,621, filed herewith. As shown in FIG. 2, the separator coalescing element 42 comprises a spool having a foraminous hub 44 and flanges 46 and 48. The lower flange 48 is solid and extends across the hollow interior of the hub 44 so that emulsion entering the hub 44 can get out only through the openings in the circumference of the hub and through winding 50 on the spool between the flanges 46 and 44.

Flowing the liquid from the inside toward the outside of the separator coalescing filter has the advantage that the fluid velocity decreases as the liquid moves toward the outside of the filter. This progressively slower rate of flow, as the microscopic particles of oil agglomerate, improves the separation that occurs at the periphery of the filter. The sides of the filter on which the oil droplets 52 form, is spaced a substantial distance from the walls of the chamber 26 that confront the periphery of the coalescing filter so that the water which flows through the windings of the filter can flow downward at a velocity which is low enough to permit the droplets 52 to float upward counter to the direction of the water flow. This velocity is inversely related to the specific gravity of the oil.

The winding 50 will be described in connection with FIGS. 2–4. For the present it is sufficient to understand that it is an oleophilic material saturated with oil. The emulsion passing through the winding 50 has the droplets of oil brought together in the pores or interstices of the winding 50 so that microscopic particles of oil agglomerate in the interstices. Then they are pushed slowly outward to make further contact with other microscopic oil particles until they form oil droplets 52 on the outside surface of the winding 50. As noted earlier, conventional separators achieve coalescence at the inside surface. Here the depth of the filter is used effectively to provide sites for coalescence.

The oil droplets, shown as 52, adhere to the outside cylindrical surface of the separator coalescing filter 42 while the droplets increase in size by the extrusion of other oil through the windings 50. When a droplet 52 reaches sufficient size, its increased buoyancy causes it to float loose from the separator coalescing filter 42 and to rise to the surface of the water in the separating chamber 26. The oil above the water in the chamber 26 is indicated by stippling in FIG. 1 and designated by the reference character 54.

A tap 56 is located near the upper end of the chamber 26 and extends through a pipe controlled by a valve 58 which is opened when oil is to be drained off from the space above the water in the chamber 26. Note that the tap 56 is located on the outside or downstream side of the coalescing filter 42 rather than on the upstream side as in conventional separators.

The emulsion that passes unseparated from the coalescing filter 42 flows downward in the chamber 26 and passes through aperture 58 in the partition 16 at the bottom of the compartment 26. The aperture 58 opens into conduit 60 which in turn terminates at orifice 62 which is directly connected to the inlet of coalescing filter 64, so that the liquids must first pass through the filter 64 before traversing lower chamber 28. The chamber 28 provides another stage of separation of the oil and water. This stage is the same as the stage provided by the chamber 26. The separator coalescing filter 64 can be the same as the separator coalescing filter 42 of the chamber 26 or it can be made with different pore size.

For separating rancid machine cutting oil emulsions, experience has shown that when using a 40 micron pore size for the first separator coalescing filter 42, somewhat better results are obtained by using a 20 micron pore size for the separator coalescing filter 64 in the second lower chamber 28. This smaller pore size appears to condition the emulsion for better operation of the separator in the last and lower chamber 30 where the pore size of coalescing filter 66 is advantageously again made equal to that of the separator coalescing element 42; that is, 40 microns. The most advantageous pore size depends upon the temperature, flow rate and viscosity of the oil or other liquid which is being separated by the apparatus.

Structure of the chamber 30 corresponds to that of the chambers above it. Since the chamber 30 is at the bottom of the housing 12, there is no chamber below it. Instead of having an aperture in the bottom of the chamber 30 there is a drain 68 for removing the liquid having the higher specific gravity which extends from a location near the center of the bottom 32 through a pipe 70 that extends the passage 68 to a location near the upper end of the housing 12 as shown in the drawing. With this oil-water separator, clean water containing only a few parts, e.g., seven ppm, of oil is withdrawn from the pipe 70. By present day anti-pollution standards, this level of oil in water is acceptable.

As shown in FIG. 1, chambers 28 and 30 are also provided with taps 72 and 74 for removing the liquid having the lower specific gravity (i.e., oil). The tap 72 of chamber 28 and the tap 74 of chamber 30 open into a feedback pipe 76. This feedback pipe 76 serves as a means for connecting taps 72 and 74 of the lower chambers 28 and 30 to the inlet of the upper chamber 22. Oil from the chambers 28 and 30 is fed back as free oil into the emulsion entering the chamber 22 through the inlet 24 to improve separation.

In the construction illustrated, there is an aspirator 78 located in the inlet 24 at the end of the feedback pipe 76 and the emulsion flowing through the supply passage 24 into the chamber 22 operates the aspirator 78 to draw oil by vacuum up through the feedback pipe 76 from the taps 74 and 76. Thus free oil is drawn from the chambers 28 and 30 only when new emulsion is being supplied to the separator through the inlet passage 24. The aspirator 78 has the further advantage of breaking up the oil from the chambers 28 and 30 so that the drops will not be so large as to be lost by floating promptly to the top of the chamber 22.

Any large drops of oil in the emulsion which come through the inlet 24 will float to the top of the chamber 22 as a result of their buoyancy and form a mass of oil 80 above the water in the dome 20. This oil is drawn off from time to time through a pipe 82 commanded by a valve 84.

The system shown in FIG. 1 is supplied with a rough separation stage in the first chamber 22 and three finer separation stages in the chambers 26, 28 and 30. In practice, it has been found that substantially 90 percent of the oil can be removed from the water in the chamber 26 and the number of successive stages which the separator is equipped with depends, therefore, upon the degree of purity of the water which is to be discharged from the separator and partly upon the velocity at which the emulsion is to be fed through the separator. It will be evident that more stages are necessary if the velocity through the first stage is very high.

FIG. 2 shows a detail construction for the separator coalescing filter 42. The upper flange 46 has a sleeve portion 86 which is secured over the lower end of the conduit 40 around the orifice 38. The winding 50 includes separate fibers 88 wrapped around the screen hub 44 in a plurality of layers. In FIG. 2 the fiber is crimped as shown by the extended portion 90 which is only partially wrapped on the underlying fibers. The advantage of making the winding 50 with crimped fiber 90 is that it permits better control of the density of the winding, that is, the density can be controlled by the amount of tension exerted on the fiber 90 as it winds on the hollow screen hub 44 when originally applying the winding 50 to the separator coalescing filters 42, 64 and 66.

FIG. 3 illustrates another construction in which a hollow screen hub 92 is wrapped with fibers which are simultaneously applied to the screen hub and which include some fibers 94 which are loose, and other fibers 96 which are wound tight. When thus winding many strands at once, loose strands which are fed at a higher rate are caused to buckle and bunch up by the tighter control strands.

The fibers 90, 94 and 96 can be made of polymerized hydrocarbons having oleophilic properties. They can be made of such oleophilic material as nylon or polypropylene. They are preferably continuously wound synthetic fibers; the continuous winding eliminating the possibility of loose fibers migrating out of the spool and into the effluent. Windings of one-half inch to four inches radius on the spools have been found to give good results; the depth depending upon the viscosity of oil and the desired flow rate. The fibers used can be within a range from 0.001 to 0.020 inches in diameter. The winding 50 is applied so as to give the separator collecting elements a controlled density. This density can vary from 20 to 80 percent.

FIG. 4 shows another construction in which the spool is a cylindrical shell with perforations 98 through the wall and all around the area to obtain a foraminous hub 100. These perforations 98 are preferably circular but can be of other shape. Instead of having a winding consisting of fibers as in the case of FIGS. 2 and 3, the separator coalescing filter of FIG. 4 has layers of sheet material 102 wound on the hub 40a. This sheet material is porous and preferably consists of a cohesive matrix of randomly arranged metallic filaments stabilized by metallurgical bonding. Such material is sold under the trade name "Dynalloy," a trademark used by Fluid Dynamics Division of Brunswick Corporation, Skokie, Illinois. The material is preferably made of stainless steel metallic filaments but other metals can be used for the purpose. The filter rating in microns of different grades of "Dynalloy" range from "Dynalloy" X3, having a filter rating in microns of three, to "Dynalloy" X13, having a filter rating in microns of 80. Other porous sheet material can be used to wrap the separator coalescing filter of FIG. 4.

The preferred embodiment of the invention has been illustrated and described, but changes and modifications can be made and some features can be used in different combinations without departing from the invention as described in the claims.

The embodiments of the invention in which an exclusive property or privilege is claimed are defined as follows:

1. In a system for separating a mixture of two fluids having different specific gravities (e.g., an oil-water emulsion) which includes
    a plurality of vertically stacked separating chambers with the highest one having an inlet for the introduction of the mixture into the system,
    means for coupling the chambers into a hydraulic series connection in which the mixture can flow from an aperture at the bottom of a higher chamber into an orifice in the top of a lower chamber,
    a coalescing filter in each lower chamber through which the mixture must pass,
    a drain at the bottom of the lowest chamber for removing the liquid having the higher specific gravity,
    means for connecting the inlet of each coalescing filter directly to the orifice in its respective chamber so that the mixture must pass through the coalescing filter before traversing the separating chamber, and
    taps located near the tops of each of the chambers on the downstream sides of the coalescing filter to remove the liquid having the lower specific gravity, the improvement comprising:
    means for hydraulically connecting a tap from a lower chamber to an inlet of the highest chamber whereby free oil may be recirculated through the system.

2. The invention of claim 1 wherein the coalescing filter comprises:
    a winding made of an oleophilic material.

3. The invention of claim 2 wherein the oleophilic material is:
    polymerized hydrocarbon having oleophilic properties.

4. The invention of claim 3 wherein:
    the polymerized hydrocarbon is polypropylene.

5. The invention of claim 3 wherein the polymerized hydrocarbon is:
    nylon.

6. The invention of claim 1 wherein the coalescing filter comprises:
    a porous, cohesive matrix of randomly arranged metallic filaments stabilized by metallurgical bonding.

7. The invention of claim 6 wherein the metallic filaments are:
   stainless steel.
8. In a system for separating a mixture of two fluids having different specific gravities (e.g., an oil-water emulsion) which includes
   a plurality of vertically stacked separating chambers with the highest one having an inlet for the introduction of the mixture into the system,
   means for coupling the chambers into a hydraulic series connection in which the mixture can flow from an aperture at the bottom of a higher chamber into an orifice in the top of a lower chamber
   a coalescing filter in each lower chamber through which the mixture must pass,
   a drain at the bottom of the lowest chamber for removing the liquid having the higher specific gravity,
   means for connecting the inlet of each coalescing filter directly to the orifice in its respective chamber so that the mixture must pass through the coalescing filter before traversing the separating chamber, and
   taps located near the tops of each of the chambers on the downstream sides of the coalescing filter to remove the liquid having the lower specific gravity,
   the improvement comprising:
      an aspriator in the inlet which is connected to a tap from a lower chamber
   whereby free oil may be broken into small drops for improved recirculation.

* * * * *